US011123928B2

(12) United States Patent
Kremer et al.

(10) Patent No.: US 11,123,928 B2
(45) Date of Patent: *Sep. 21, 2021

(54) PLANT COMPRISING AT LEAST ONE APPARATUS FOR ADDITIVELY MANUFACTURING THREE-DIMENSIONAL OBJECTS

(71) Applicant: CONCEPT LASER GMBH, Lichtenfels (DE)

(72) Inventors: Viktor Kremer, Lichtenfels (DE); Andreas Lutz, Freising (DE); Dragan Filipovic, Garching bei München (DE); Roland Menassa, Macomb, MI (US); Danilo Veljkovic, Ypsilanti, MI (US); Alexander Hofmann, Weismain (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,638

(22) Filed: Feb. 13, 2019

(65) Prior Publication Data

US 2019/0299533 A1 Oct. 3, 2019

(30) Foreign Application Priority Data

Mar. 28, 2018 (EP) .................................... 18164755

(51) Int. Cl.
*B29C 64/379* (2017.01)
*B29C 64/182* (2017.01)
(Continued)

(52) U.S. Cl.
CPC ............ *B29C 64/379* (2017.08); *B22F 12/00* (2021.01); *B29C 64/153* (2017.08);
(Continued)

(58) Field of Classification Search
CPC ... B29C 64/379; B29C 64/259; B29C 64/153; B29C 64/20; B22F 3/1055;
(Continued)

(56) References Cited

U.S. PATENT DOCUMENTS 8,888,480 B2 * 11/2014 Yoo ........................ B29C 64/245
425/375
1,061,874 A1 4/2020 Wahrén
(Continued)

FOREIGN PATENT DOCUMENTS

CN 105666875 A 6/2016
EP 3214024 A1 9/2017
(Continued)

OTHER PUBLICATIONS

European Search Report Corresponding to Application No. 18164755 dated Sep. 19, 2018.

(Continued)

*Primary Examiner* — Nahida Sultana
(74) *Attorney, Agent, or Firm* — Dority & Manning, P.A.

(57) ABSTRACT

Plant (1) comprising at least one apparatus (2-4) for additively manufacturing three-dimensional objects by means of successive layerwise selective irradiation and consolidation of layers of a build material which can be consolidated by means of an energy source, which plant (1) comprises at least one module (5) separably connected or connectable with the apparatus (2-4), wherein the plant (1) comprises at least one tunnel structure (7) through which the at least one module (5) is moveable in a tunnel transport direction (10).

19 Claims, 3 Drawing Sheets

(51) Int. Cl.
  *B29C 64/153*  (2017.01)
  *B29C 64/25*  (2017.01)
  *B29C 64/259*  (2017.01)
  *B29C 64/20*  (2017.01)
  *B22F 12/00*  (2021.01)
  *B33Y 10/00*  (2015.01)
  *B33Y 30/00*  (2015.01)
  *B33Y 40/00*  (2020.01)
  *B22F 10/10*  (2021.01)

(52) U.S. Cl.
  CPC ............ *B29C 64/182* (2017.08); *B29C 64/20* (2017.08); *B29C 64/25* (2017.08); *B29C 64/259* (2017.08); *B22F 10/10* (2021.01); *B33Y 10/00* (2014.12); *B33Y 30/00* (2014.12); *B33Y 40/00* (2014.12)

(58) Field of Classification Search
  CPC . B22F 2003/1056; B33Y 10/00; B33Y 30/00; B33Y 40/00; B28B 1/001
  See application file for complete search history.

(56) References Cited

U.S. PATENT DOCUMENTS

| | | | | |
|---|---|---|---|---|
| 2006/0054039 | A1* | 3/2006 | Kritchman | B29C 64/106 101/424.1 |
| 2006/0219671 | A1* | 10/2006 | Merot | B33Y 40/00 219/121.6 |
| 2012/0305364 | A1 | 12/2012 | Morimoto et al. | |
| 2017/0113406 | A1* | 4/2017 | Chen | B29C 64/129 |
| 2018/0056393 | A1* | 3/2018 | Herzog | B33Y 30/00 |
| 2018/0141275 | A1* | 5/2018 | Patel | B33Y 30/00 |
| 2019/0009334 | A1* | 1/2019 | Effernelli | B29C 64/153 |
| 2019/0126559 | A1* | 5/2019 | Herzog | B29C 64/393 |
| 2019/0224919 | A1* | 7/2019 | Houben | B29C 64/106 |
| 2019/0344500 | A1* | 11/2019 | Cote | B22F 12/00 |
| 2019/0351613 | A1* | 11/2019 | Frutuoso | B33Y 30/00 |
| 2020/0230883 | A1* | 7/2020 | Hofmann | B29C 64/245 |
| 2020/0316861 | A1* | 10/2020 | Vierling | B22F 12/00 |
| 2020/0338817 | A1* | 10/2020 | Murciego Rodriguez | B29C 64/205 |
| 2021/0053288 | A1* | 2/2021 | Bechmann | B33Y 30/00 |

FOREIGN PATENT DOCUMENTS

| | | |
|---|---|---|
| JP | 2012/253070 A | 12/2012 |
| JP | 2018/040054 A | 3/2018 |
| WO | 2012128705 A1 | 9/2012 |
| WO | 2017109395 A1 | 6/2017 |
| WO | WO2017/109394 A1 | 6/2017 |

OTHER PUBLICATIONS

Machine Translated Japanese Search Report Corresponding to Application No. 2019025477 dated Jan. 15, 2020.
Machine Translated Japanese Office Action Corresponding to Application No. 2019025477 dated Feb. 7, 2020.
Chinese Search Report Corresponding to Application No. 20910131581 dated Oct. 23, 2020.

* cited by examiner

PLANT COMPRISING AT LEAST ONE APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 164 755.3 filed Mar. 28, 2018, the contents of which is incorporated herein by reference in its entirety as if set forth verbatim.

The invention relates to a plant, comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus, wherein the plant comprises at least one tunnel structure through which the at least one module is moveable in a tunnel transport direction.

Plants for additively manufacturing three-dimensional objects comprising at least one apparatus for additively manufacturing three-dimensional objects in which a build material can selectively be consolidated to successively and layerwise built are generally known from prior art. Such apparatuses may utilize at least one module, in particular different modules, that perform certain tasks in the additive manufacturing process.

For example, the plant may comprise dose modules, build modules and overflow modules, wherein said dose modules may be used for providing "fresh" build material in the additive manufacturing process. Said build modules can be used to provide a build chamber, in which the object may additively be built in the additive manufacturing process, in particular in which the powder bed of non-consolidated build material is arranged and in which the object is selectively successively layerwise irradiated and thereby consolidated. At least one overflow module may be provided for receiving the excess build material. For example, it is possible to distribute build material that is provided via the dose module onto the powder bed that is carried via the build module, in particular arranged in at least one layer in a build plane, in which the build material may selectively be irradiated to consolidate the three-dimensional object in a layerwise successive manner. Surplus build material that is not received in the build plane can be depleted in the overflow module, for instance.

Further, it is known from prior art to separably arrange those modules in an apparatus for additively manufacturing three-dimensional objects, wherein each module can be separated from the apparatus, if the additive manufacturing process is finished or if a change of the corresponding module is deemed necessary, e.g. if a respective chamber of the apparatus is full (build chamber, overflow chamber) or, if the respective chamber is empty (dose chamber) and needs to be refilled with "fresh" build material. Hence, the respective module may be separated/disconnected from the apparatus and a "fresh" module may be connected to the apparatus.

As the additive manufacturing process cannot be performed, if the respective module is not connected to the apparatus, it is preferred to keep the times in which not all necessary modules are connected to the apparatus as low as possible.

It is an object of the present invention to provide a plant comprising at least one apparatus for additively manufacturing of three-dimensional objects, wherein the efficiency in performing additive manufacturing processes is improved.

The object is inventively achieved by a plant according to claim 1. Advantageous embodiments of the invention are subject to the dependent claims.

The plant described herein comprises at least one apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electronic beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, as described before, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a plant with at least one apparatus for additively manufacturing three-dimensional objects, wherein a tunnel structure is provided through which the at least one module is movable in a tunnel transport direction. Hence, the tunnel structure may extend through the at least one apparatus, wherein the at least one module may be moved from the tunnel structure into a module position, e.g. a work position in which the module is arranged during the additive manufacturing process, and from the module position back into the tunnel structure, e.g. if an additive manufacturing process is finished or if the module needs to be changed. The term "tunnel structure" therefore, relates to a structure through or along which the at least one module may be moved inside the apparatus for additively manufacturing of three-dimensional objects. Thus, the tunnel structure may define the path along which the at least one module may be moved through the apparats. The tunnel structure does not necessarily require a complete housing or an enclosure of the module while it is moved in tunnel transport direction. The tunnel structure may provide respective means for moving the at least one module in the tunnel structure, such as guiding elements, e.g. slides, or conveying means, for example a conveyor belt or the like.

The invention is based on the idea that at least one module is moveable from the tunnel structure into two different module positions inside the at least one apparatus along a first direction, wherein the at least one module is moveable from the module positions into the tunnel structure along a second direction, wherein the first direction and the second direction differ from the tunnel transport direction. Thus, it is possible to move the at least one module into the apparatus and inside the apparatus along the tunnel transport direction, wherein the module is moved through the apparatus via the tunnel structure. From the tunnel structure it is possible to move the module in at least two different module positions inside the apparatus. The module may be moved back into the tunnel structure from those module positions, e.g. after the additive manufacturing process is finished.

For example, it is possible that the at least one apparatus for additively manufacturing three-dimensional objects comprises multiple module positions, for example for the same type of module or different types of modules, in particular each apparatus may comprise at least two module positions for each type of module. Thus, a module may be moved into the apparatus and inside the apparatus towards the corresponding module position, e.g. a work position of the module, via the tunnel structure. The module can then be moved from the tunnel structure into one of the module positions along a first direction, e.g. into a work position. Afterwards, the at least one module may be moved from the module position back into the tunnel structure along a second direction, e.g. contrary to the first direction. Both, the first direction and the second direction differ from the tunnel transport direction.

Hence, it is possible to move the at least one module from the tunnel structure in either one of two different module positions that are provided for the respective module. It is possible that the at least one apparatus for additively manufacturing three-dimensional objects utilizes different types of modules in the additive manufacturing process, wherein for each type of module at least two different module positions may be provided inside the apparatus. The different module positions may be the same positions, such as work positions, or different types of positions, as will be described below. Hence, it is possible that each apparatus has for example, two different work positions for each type of module, in particular two dose positions, two build positions and two overflow positions, wherein in each position the respective type of module can be arranged. Further it is to be understood that the tunnel structure is typically used to move the at least one module into the apparatus and out of the apparatus, although it is also possible to insert and remove each module into or out of the apparatus using another loading path/unloading path.

Regarding the first direction and the second direction, as described before, it is preferred that the first direction and the second direction may essentially be oriented in opposite directions. The term "essentially oriented" may relate to different orientations of the two directions that are not exactly arranged in opposite directions, but embodiments in which the first direction and the second direction comprise at least one component directing in opposite directions. Thus, the term "essentially oriented in opposite directions" also comprises arrangements in which the at least one module is moved from the tunnel structure into the module position under a defined angle, e.g. an angle of 45°, and back into the tunnel structure under a defined angle, e.g. the same angle or a different angle, following the same or a different path, i.e. the loading path and the unloading path may differ.

Both directions, i.e. the first direction and the second direction, comprise a component that is oriented in opposite directions, moving the module from the tunnel structure into the module position or from the module position into the tunnel structure, respectively. In other words, the term "essentially oriented in opposite directions" does not necessarily involve that the loading path and the unloading path (movement paths from the tunnel structure into the module position and from the module position into the tunnel structure) are exactly arranged in opposite directions or that the loading path exactly matches the unloading path, wherein the module is moved in the opposite direction or vice versa.

The at least one apparatus may comprise at least one work position, wherein at least one module can be positioned in the at least one work position during the additive manufacturing process, wherein the at least one module is movable along a loading direction from the tunnel structure into the work position and/or along the unloading direction from the work position into the tunnel structure. Hence, the first direction and the second direction can also be deemed as loading direction and unloading direction moving the at least one module from the tunnel structure into the work position or from the work position into the tunnel structure, respectively. The module can be connected to the apparatus in the work position, wherein it is possible to connect the module, in particular a chamber of the module, to the atmosphere inside the apparatus, e.g. an inert (process gas) atmosphere. The connection of the inside of the process chamber of the apparatus and the inside of the module chamber is again disconnected or separated, respectively, if the module is disconnected from the apparatus.

As described before, the work position may correspond to the type of module or each type of module is suitable to be moved in a corresponding work position. For example, dose modules, build modules and overflow modules can be provided, wherein the work position for each type of module differs from the other work positions. In particular, a work position for a dose module may be deemed dose position, the work position for the build module may be deemed build position and the work position for the overflow module may be deemed overflow position, for instance.

As also described before, the at least one apparatus may comprise two different work positions for each type of module (optional), e.g. two dose positions, two build positions and two overflow positions, for instance, that can be arranged and operated in parallel.

Additionally or alternatively it is also possible that at least one apparatus comprises at least one buffer position, in which at least one module can be positioned in advance to an additive manufacturing process, wherein at least one module is movable along a buffer direction from the tunnel structure into the buffer position and is movable from the buffer position into a corresponding work position along an unbuffer direction, in particular along a loading direction. Thus, it is possible that the apparatus comprises at least one buffer position in which the module may be arranged, for example in advance to an additive manufacturing process. The module being arranged in the buffer position may be stored or buffered, respectively, until the module that is currently used and arranged in the work position is separated from the apparatus, for example if the additive manufacturing process is finished or the used module has to be replaced with the "fresh" module being arranged in the buffer position. After the used module has been removed from the work position, the module arranged in the buffer position can be moved in unbuffer direction, which preferably extends in loading direction, in that the module can be loaded into the work position.

Thus, if the work position for the corresponding type of module becomes vacant, it is possible to move the fresh module that is already stored ("waiting") in the buffer position into the work position. Thus, downtimes of the apparatus can significantly be reduced, as the next module that is required to be moved into the work position is already stored in the buffer position and can therefore, instantly be used after the used module has been removed from the work position. For example, the buffer position and the work position may be arranged in different positions on different sides of the tunnel structure. In other words, it is possible to move a module from the (same position in the) tunnel structure into the work position or into the buffer position, wherein the buffer direction and the loading direction are arranged in different, in particular opposite, directions. If the used module has to be removed from the work position, the used module is moved in unloading direction from the work position into the tunnel structure and can, for example, be moved out of the apparatus along the tunnel transport direction.

Another "fresh" module that has been moved along the buffer direction from the tunnel structure into the buffer position can then be moved from the buffer position in unbuffer direction into the tunnel structure and in loading direction into the work position as soon as the used module has been removed from the work position. Of course it is also possible to move the fresh module from the buffer position directly into the work position along unbuffer direction/loading direction. Of course, the next fresh module can then be stored in the buffer position from the tunnel structure along buffer direction to "refill" the vacant buffer position that became vacant due to the movement of the fresh module that was stored in the buffer position into the work position.

Preferably, a module being moved from the buffer position into the work position may be moved across the tunnel structure. Although, it is possible to arrange the tunnel structure in another way, for example in that a module can be moved from the tunnel structure through the buffer position into the work position it is preferred that the tunnel structure extends between the buffer position and the work position. For example, a module that is arranged in the buffer position is moved in unbuffer direction into the tunnel structure and can then be moved along loading direction from the tunnel structure into the work position. Thus, it is advantageously possible to move the module along the tunnel structure extending between the buffer position and the work position, as both, the work position and the buffer position are accessible from the tunnel structure at any time. In other words, a module may be removed from the work position without moving a module waiting in the buffer position and, vice versa, a module may be moved into the buffer position or out of the buffer position without interfering with a module being arranged in the work position.

According to another preferred embodiment of the inventive plant, the at least one apparatus may comprise three buffer positions, wherein the three buffer positions correspond to three work positions and wherein the three different types of modules can be arranged in the three different types of buffer positions or the three different types of work positions. As mentioned before, it is possible to provide different types of modules that can be used to perform different tasks in the additive manufacturing process, such as dose modules, build modules and overflow modules. The three different types of modules may therefore, form a "triplet" that can be simultaneously used in the same additive manufacturing process. For example, the dose module may provide the build material to a build module, in which the build material may be arranged in the build plane and selectively irradiated and consolidated to form the three-dimensional object. Excess build material from the application process step can be moved/conveyed to the overflow module in which it can be received in a corresponding overflow chamber.

After the additive manufacturing process is finished the three modules being arranged in the corresponding work positions can (simultaneously) be separated from the apparatus and moved from the corresponding work positions into the tunnel structure (along the unloading direction) and removed from the apparatus. Self-evidently, it is also possible to individually change the modules as needed, for example, the overflow module is only changed, if a fill level of excess build material inside the overflow chamber reaches a predefined fill level or the dose module is only changed, if the fill level of fresh build material inside the dose chamber reaches a predefined fill level, in particular, if the dose chamber is empty or the overflow chamber is full, respectively. For each of the work positions (dose position, build position, overflow position) a corresponding buffer position may be provided in that each apparatus, for example, comprises three buffer positions and three corresponding work positions. Of course, it is also possible that the at least one apparatus for additively manufacturing of three-dimensional objects comprises more or less than three work positions and more or less than three buffer positions.

According to another embodiment of the inventive plant, at least one apparatus may comprise at least two work positions arranged on opposite sides of the tunnel structure, in particular three different types of work positions for the three different types of modules arranged on both sides of the tunnel structure. Thus, it is possible that each "module position" as described before, represents or is built as a work position (for the corresponding type of module). Thus, at least one module may be moved from the tunnel structure in either one of at least two work positions that are arranged on opposite sides of the tunnel structure. For example at least one apparatus may comprise at least two work positions that are arranged on opposite sides of the tunnel structure or multiple work positions, such as described before, three work positions for three different types of modules that are arranged on opposite sides of the tunnel structure.

Preferably, the at least one apparatus comprises a dose position, a build position and an overflow position on each side of the tunnel structure. In other words a dose module, a build module and an overflow module may be moved from the tunnel structure into the corresponding dose position, build position and overflow position, wherein a triplet of work positions may be arranged on every side of the tunnel structure. In other words, a module may be moved from the tunnel structure into one of two (identical) work positions, wherein the work positions are arranged on opposite sides of the tunnel structure. Thus, the module may be moved, for example, from the tunnel structure along a loading direction extending in a first direction, e.g. "to the left", into the work position or along a loading direction extending in a second direction, e.g. "to the right" into one of corresponding two work positions. Thus, it is possible to perform two additive manufacturing processes simultaneously or in parallel on the at least two work positions arranged on opposite sides of the tunnel structure.

Of course, this embodiment can be combined with any other embodiment, as described before, wherein a corresponding buffer position may be assigned to each of the at least two work positions arranged on opposite sides of the tunnel structure. In other words, at least one module may be moved from the tunnel structure into the buffer position, in which the at least one module may be stored in advance to the additive manufacturing process. The at least one module may then be moved from the buffer position to the work position. As described before, the arrangement of the buffer position and the corresponding work position is arranged on both sides of the tunnel structure or a buffer position may be arranged in advance to each work position, respectively.

Further, at least one module may be movable into the apparatus and/or out of the apparatus via the tunnel structure. This allows for inserting the at least one module into the apparatus and/or removing the at least one module from the apparatus via the tunnel structure. Thus, the tunnel structure is not only provided for moving the at least one module inside the apparatus, but the tunnel structure also connects the apparatus to the outside. For example, a pre-processing station and/or a post-processing station may be connected to the at least one apparatus via the tunnel structure, wherein fresh modules may be provided via a pre-processing station that pre-processes the at least one module and moves the at least one pre-processed module via the tunnel structure into the apparatus. Analogously, a module being removed from the apparatus via the tunnel structure may be moved to at least one post-processing station in which the module may be post-processed. Thereby, the tunnel structure extends through the at least one apparatus.

According to another embodiment of the inventive plant, the plant comprises a plurality of apparatuses, wherein the tunnel structures of at least two apparatuses are connected to each other. Thus, the at least two apparatuses may be deemed as connected in series, wherein the tunnel structures of the at least two apparatuses are connected together. Thus, a module being moved into the tunnel structure may be moved to any of the at least two apparatuses that are being connected via their tunnel structures. Thus, one end of the tunnel structure may be deemed as "entrance" and the opposing end of the tunnel structure may be deemed as "exit" for the modules, wherein modules that are to be used in an additive manufacturing process can be moved into the tunnel structure via the entrance and be moved to the corresponding buffer position or work position into one of the at least two apparatuses. At least one used module can be moved from the corresponding work position back into the tunnel structure and removed from the corresponding apparatus via the exit of the tunnel structure. Thus, the tunnel transport direction extends along the tunnel structure extending from the entrance to the exit of the tunnel structure, wherein the tunnel transport direction is the same for every module. Of course, the tunnel structure may extend further than the entrance/exit provided in the first/last apparatus, for example, the tunnel structure may extend further from/towards a pre-processing/post-processing station.

The inventive plant can further be improved in that at least one first outer buffer region may be arranged in advance to the tunnel structure of the at least one apparatus and/or at least one second outer buffer region may be arranged behind the tunnel structure of the at least one apparatus with respect to the tunnel transport direction. Thus, the buffer positions, as described before, being arranged inside the at least one apparatus may also be deemed as "inner buffer region" and the "outer buffer regions" described with respect to the present embodiment can be deemed as being arranged outside the apparatus. Thus, the tunnel structure may extend beyond the at least one apparatus in advance to the entrance of the tunnel structure and beyond the exit of the tunnel structure providing a first outer buffer region advance to the tunnel structure and a second outer buffer region extending behind the exit of the last tunnel structure of the last of the at least two apparatuses that are connected via their tunnel structures.

Hence, it is possible that at least one module may be stored in the first outer buffer region before it is inserted into the tunnel structure (via the entrance of the corresponding tunnel structure) of the corresponding apparatus for additively manufacturing three-dimensional objects, for example after being pre-processed via a corresponding pre-processing station, e.g. a refill station. It is also possible that at least one module that has been removed from one of the apparatuses via the exit of the tunnel structure is stored in the at least one second outer buffer region, for example before being post-processed in a post-processing station, e.g. a handling station. Further, each module that is arranged in an out buffer region may be manipulated, e.g. pre-processed or post-processed.

Preferably, the plant may be adapted to individually load modules into the tunnel structure dependent on at least one vacancy parameter relating to the type of the module and/or a type of at least one vacant work position and/or the type of at least one vacant buffer position. Thus, it is possible that the plant monitors or determines, whether at least one module position, i.e. the work position and/or a buffer position, inside at least one apparatus for additively manufacturing three-dimensional objects, is vacant or becomes vacant. Dependent on whether a module position is or becomes vacant, it is possible to individually load a corresponding module into the tunnel structure that can be moved along the tunnel transport direction towards the vacant module position and can be loaded into the vacant module position along the loading direction or the buffer direction, respectively. The plant may therefore, comprise the means for determining whether a module position is occupied or is vacant or becomes vacant, e.g. via a corresponding control unit and suitable detection means. It is also possible to remove a faulty module, e.g. a module with which the manufacturing process cannot be continued, such as a module with a broken carrying device, and to replace the module position that became vacant due to the removal of the faulty module with a fresh module of the same type.

Further, it is possible that the plant may be adapted to load the tunnel structure with at least two modules in a predefined order, preferably dependent on at least one process parameter. Hence, at least two modules may be loaded into the tunnel structure in a predefined order, in particular a sequence defines the order in which the at least two modules are used in the additive manufacturing process. The predefined order may be defined dependent on at least one process parameter, for example a required amount of build material or at least one process status of an additive manufacturing process performed in the at least one apparatus. For example, if it is detected that an additive manufacturing process is finished or is about to be finished in the near future, the corresponding modules that are needed for the replacement of the modules that are or will be removed from the corresponding apparatus, can be loaded into the tunnel structure in the right order.

The modules may be moved in the tunnel structure via at least one transport unit, in particular alinear transport unit, preferably a conveyor. Thus, the module may only be passively moved via an external transport unit, for example the modules may be placed on the transport unit and be moved via the transport unit throughout the tunnel structure. It is possible that the transport unit comprises means for moving the at least one module from the tunnel structure into the module positions and from the module positions back into the tunnel structure from where it can be moved along the tunnel transport direction through the at least one apparatus.

Additionally or alternatively, it is also possible that at least one mobile transport unit (for example integrated in the module) is provided that is adapted to transfer at least one module to the tunnel structure or the first outer buffer region and/or to receive at least one module from the tunnel structure or from the second outer buffer region. It is also possible that at least one module is entirely automated, for example an automated vehicle, and is individually movable, preferably due to an individual motor integrated in each module.

According to another embodiment of the inventive plant, at least one mobile transfer unit may be adapted to transfer the at least one module between a pre-processing station and the tunnel structure or the first outer buffer region and/or between the tunnel structure or the second outer buffer region and a post-processing station. As described before, the mobile transfer unit may be deemed as being external to the module and receiving the module for moving the module or the mobile transfer unit may be deemed as being integrated into the module. Thus, it is possible that the mobile transfer unit moves the at least one module outside the at least one apparatus providing the at least one module to the first outer buffer region or the tunnel structure or receiving the at least one module from the tunnel structure or the second outer buffer region. It is particularly possible that the at least one mobile transfer unit moves the at least one module between the pre-processing station and the tunnel structure or the first outer buffer region or between second outer buffer region or the tunnel structure and a post-processing station.

Besides, the invention relates to an apparatus for additively manufacturing three-dimensional objects by means of successive layerwise selective irradiation and consolidation of layers of a build material which can be consolidated by means of an energy source, in particular an apparatus for an inventive plant, as described before, wherein at least one module is separably connected or connectable with the apparatus, wherein the apparatus comprises at least one tunnel structure through which the at least one module is moveable in a tunnel transport direction, wherein at least one module is moveable from the tunnel structure into two different module positions inside the apparatus along a first direction, wherein the at least one module is moveable from the module positions into the tunnel structure along a second direction, wherein the first direction and the second direction differ from the tunnel transport direction.

Further, the invention relates to a method for moving at least one module in a plant, in particular an inventive plant, as described before, comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus, wherein the plant comprises at least one tunnel structure through which the at least one module is moveable or is moved in a tunnel transport direction, wherein at least one module is moved from the tunnel structure into one of at least two different module positions inside the apparatus along a first direction, wherein the at least one module is moved from the module position into the tunnel structure along a second direction, wherein the first direction and the second direction differ from the tunnel transport direction.

Self-evidently, all details, features and advantages described with respect to the inventive plant are fully transferable to the inventive apparatus and the inventive method. In particular, the inventive method may be used for moving the at least one module in an inventive plant, wherein the inventive plant may comprise at least one inventive apparatus.

Exemplary embodiments of the invention are described with reference to the FIG. The FIG. are schematic diagrams, wherein FIG. 1 shows an inventive plant according to a first embodiment;

Figure 1:
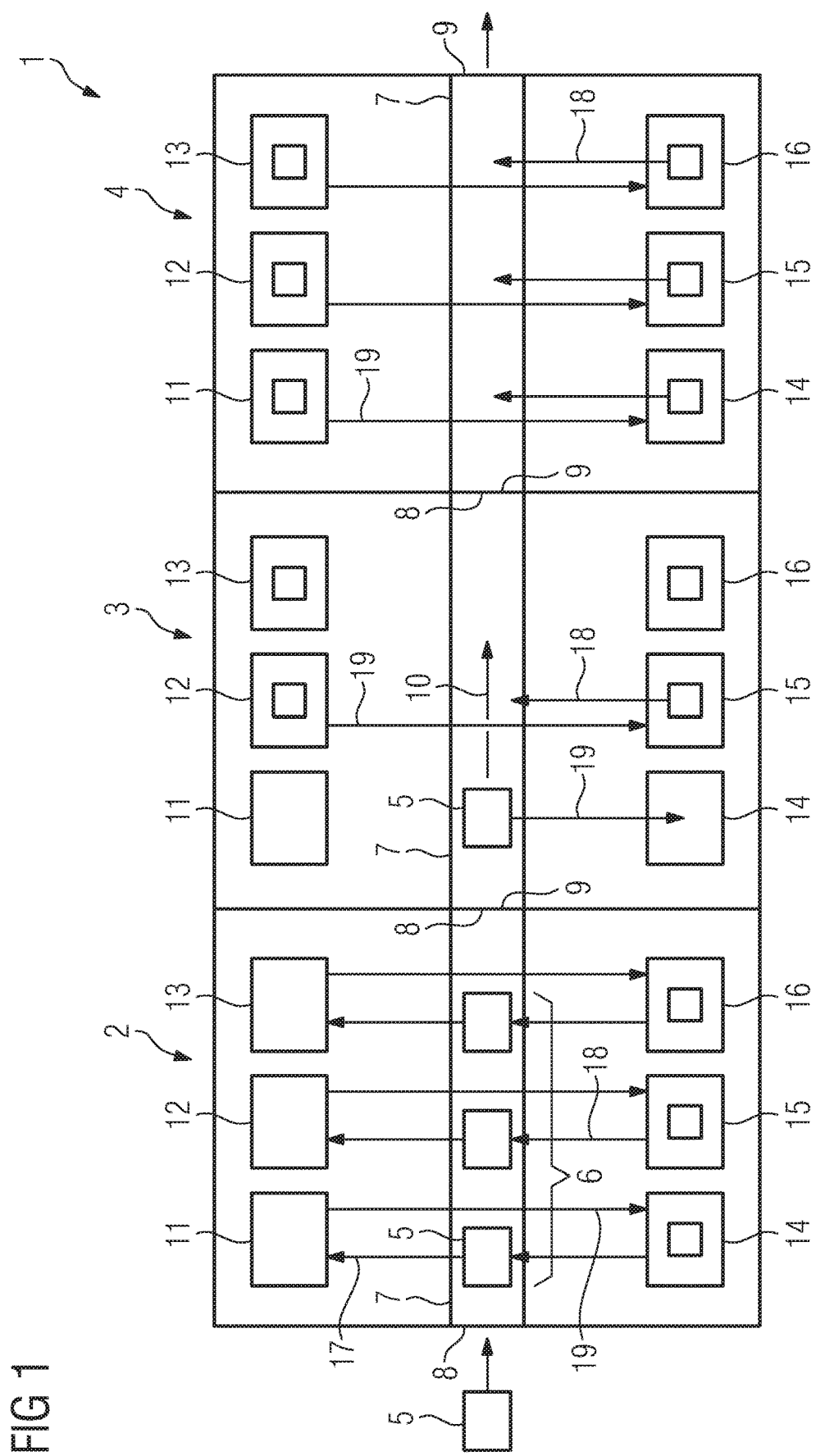

FIG. 1 shows a plant 1 comprising three apparatuses 2, 3, 4 for additively manufacturing three-dimensional objects by means of successive layerwise selective irradiation and consolidation of layers of a build material which can be consolidated by means of an energy source, for example a laser beam or an electron beam. The plant 1 comprises a plurality of modules 5 that can for example be built as dose modules, build modules and overflow module. Dose modules are used in the additive manufacturing process performed via the plant 1 to provide build material in the additive manufacturing process, whereas build modules are adapted to receive the build material provided via the dose modules and to provide a build chamber in which the object is additively built by selectively irradiating layers of build material. Build material that is provided via the dose module and is not received within the build module, i.e. excess build material, is received within an overflow module. Hence, three corresponding modules 5 (dose module, build module, overflow module) may form a triplet 6.

FIG. 1 further shows that apparatus 2-4 comprises a tunnel structure 7 that extends through the respective apparatus 2-4, wherein the tunnel structures 7 of the individual apparatuses 2-4 are connected to each other forming a common tunnel structure. Hence, a module 5 can be inserted into the tunnel structure 7 of the apparatus 2 via an entrance 8 and can be removed from the apparatus 2 via an exit 9. As can be derived from FIG. 1, the exit 9 of the tunnel structure 7 of the apparatus 2 is (directly) connected to the entrance 8 of the tunnel structure 7 of the apparatus 3. Analogously, the exit 9 of the tunnel structure 7 of the apparatus 3 is connected to the entrance 8 of the tunnel structure 7 of the apparatus 4. Via the exit 9 of the tunnel structure 7 of the apparatus 4 the modules 5 may be removed from the common tunnel structure.

FIG. 1 further shows that the modules 5 can be moved through the tunnel structures 7 via a tunnel transport direction (depicted via arrow 10). The apparatuses 2-4 comprise multiple module positions 11-13 and 14-16. The module positions 11-13 are arranged on one side of the tunnel structure 7 and the module positions 14-16 are arranged on the other, in particular the opposite, side of the tunnel structure 7. In the exemplary embodiment that is depicted in FIG. 1, the module positions 11-13 are built as buffer positions, whereas the module positions 14-16 are built as work positions. Hence, a module 5 that is moved in the tunnel structure 7 of the apparatus 2-4 can be moved from the tunnel structure 7 along a buffer direction 17 into one of the module positions 11-13 (buffer positions), for instance. As the module positions 11-13 are vacant in the exemplary embodiment did in FIG. 1, the modules 5 that are moved into the tunnel structure 7 of the apparatus 2 will be moved into the corresponding module positions 11-13 as a triplet 6. The corresponding work positions 14-16 are occupied via respective modules 5.

In this exemplary embodiment, the work position 14 may be deemed as dose position, the work position 15 may be deemed as build position and the work position 16 may be deemed as overflow position, wherein a dose module is arranged in the module position 14 (dose position), a build module is arranged in the module position 15 (build position) and an overflow module is arranged in the module position 16 (overflow position). Thus, if the additive manufacturing process that is currently performed using the module positions 14-16 is finished, the modules 5 being arranged in the module positions 14-16 can be removed from the module positions 14-16 via an unloading direction 18 (depicted via arrow). Subsequently, the modules 5 being arranged in the module positions 11-13 (buffer positions) can be moved along a loading direction 19 into the module positions 14-16 (work positions). Self-evidently, the module positions 11-13 can be "refilled" with corresponding modules 5 being moved from the tunnel structure 7 into the module positions 11-13 along a buffer direction 17.

It is also possible to individually load/unload modules 5, as depicted in the apparatus 3. A module 5 is moved into the tunnel structure 7 of the apparatus 3, wherein the module position 11 is vacant and the module position 14 is also vacant. As the module position 14 is a work position, as described before, the module 5, for example a dose module, can instantly be moved along the loading direction 19 into the module position 14. Hence, the module position 11 stays vacant and can be "refilled" with a corresponding module 5 being moved from the tunnel structure 7 to the module position 11 along buffer direction 17, as described before with respect to the apparatus 2.

Further, it is indicated that the module 5 being arranged in the module position 15 needs to be a changed. To change the module 5 being arranged in the module position 15, the module 5 is being moved from the module position 15 to the tunnel structure 7 along the unloading direction 18 and the module 5 being arranged in the module position 12 (buffer position for the module position 15) is moved along loading direction 19 into the module position 15.

With respect to the apparatus 4, as depicted in FIG. 1, it is also possible to change the modules 5. For example, if the additive manufacturing process performed in the apparatus 4 is finished, the modules 5 being arranged in the work positions, i.e. the module positions 14-16 are removed along the unloading direction 18 into the tunnel structure 7 from where the modules 5 can be removed from the plant 1 following the tunnel transport direction 10 leaving the exit 9 of the tunnel structure 7 of the apparatus 4. Subsequently, the modules 5 being arranged in the module positions 11-13 can be moved along loading direction 19 from the corresponding module positions 11-13 (buffer positions) into the module positions 14-16 (work positions) in that the additive manufacturing process can be performed.

Figure 2:
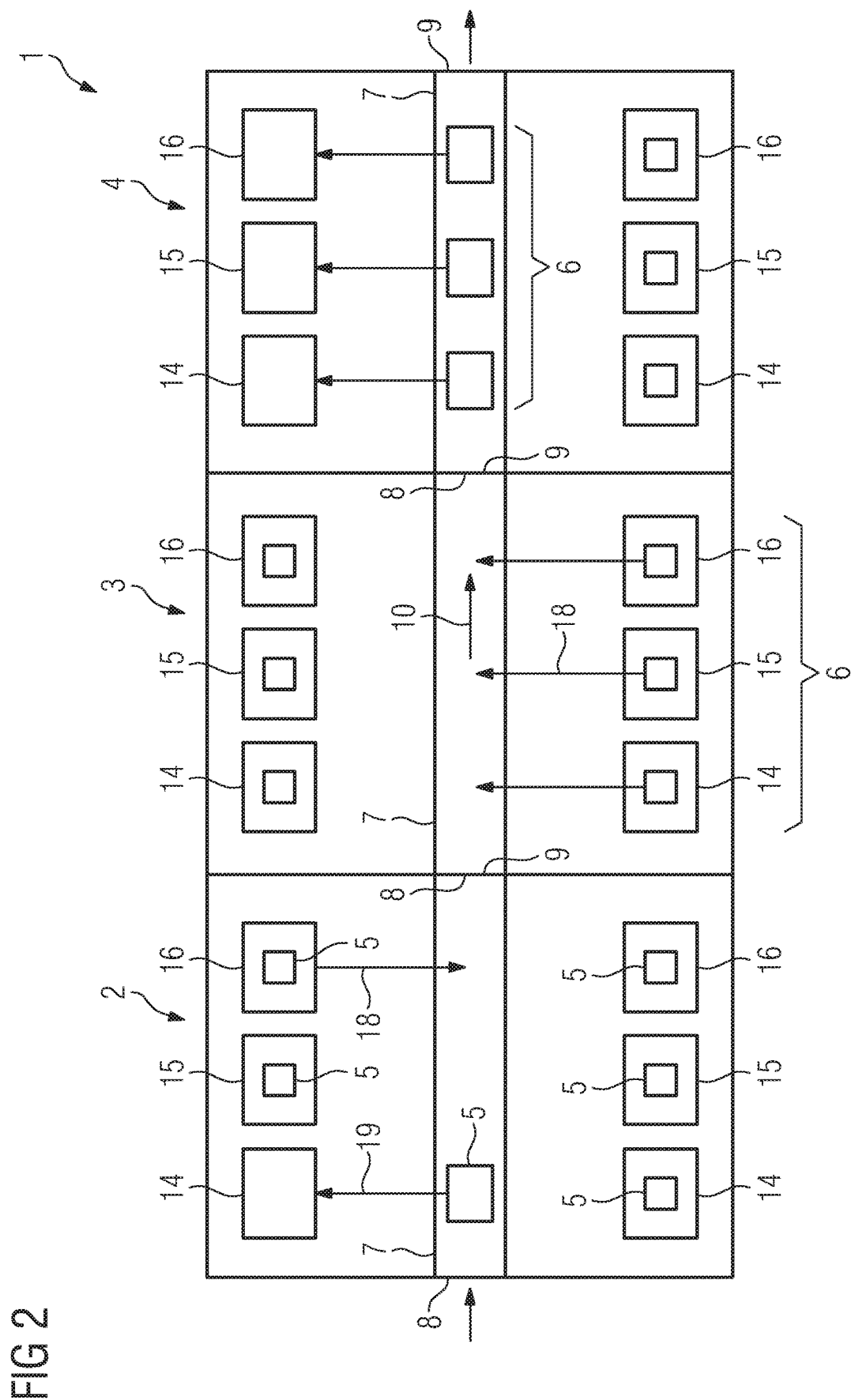
FIG. 2 shows an inventive plant according to a second embodiment.

FIG. 2 shows a plant 1 according to a second embodiment, wherein the plant 1 again comprises apparatuses 2-4 and wherein multiple modules 5 are used in an additive manufacturing process that is performed via the apparatuses 2-4. In the exemplary embodiment depicted in FIG. 2, each apparatus 2-4 comprises two sets of module positions 14-16, i.e. two sets of work positions, as described before. In other words, each module 5 being transported along tunnel transport direction 10 in the tunnel structure 7 can be moved to either one of the module positions 14-16, wherein two module positions 14, two module positions 15 and two module positions 16 are arranged to both sides of the tunnel structure 7 in each apparatus 2-4. Thus, two separate additive manufacturing processes can be performed via each apparatus 2-4 simultaneously or in parallel, respectively.

As depicted in FIG. 2, the module 5 being inserted into the tunnel structure 7 of the apparatus 2 via the entrance 8 can be moved along loading direction 19 into the module position 14 of the apparatus 2. The module 5 being arranged in the module position 16 of the apparatus 2 can be removed into the tunnel structure 7 of the apparatus 2 along the unloading direction 18. Subsequently, another module 5 of the same type can be inserted into the tunnel structure 7 and moved from the tunnel structure 7 into the now vacant module position 16 along loading direction 19. As can be derived from FIG. 2, the loading direction 19 and the unloading direction 18 are essentially oriented in different, in particular opposing, directions and differ from the tunnel transport direction 10. This also holds true for the exemplary embodiment of the plant 1, as depicted in FIG. 1.

As can further be derived from FIG. 2, the modules 5 being arranged in the module positions 14-16 of the apparatus 3 can be removed as a triplet 6 from the module positions 14-16 and can therefore, be moved along the unloading direction 18 into the tunnel structure 7 of the apparatus 3. The removed modules 5 may be moved along tunnel transport direction 10 along the tunnel structure 7 of the apparatus 3 into the tunnel structure 7 of the apparatus 4 and thereby, can exit the plant 1 via the exit 9 of the tunnel structure 7 of the apparatus 4.

Subsequently, fresh modules 5 may be inserted into the now vacant triplet of module positions 14-16 and another additive manufacturing process can be performed in the apparatus 3.

Further, FIG. 2 shows that the triplet 6 of modules 5 in the tunnel structure 7 of the apparatus 4 may be moved along the loading direction 19 into the triplet of vacant module positions 14-16 of the apparatus 4. The plant 1 is adapted to load the triplet 6 of modules 5 in the into the tunnel structure 7 and move the triplet 6 along the tunnel transport direction 10 into the apparatus 4 in that the triplet 6 can be loaded into the module positions 14-16. Of course, it is also possible to combine the apparatuses 2-4 depicted in the plant 1, according to the embodiment depicted in FIG. 1 with apparatuses 2-4 depicted in the embodiment according to FIG. 2. Hence, apparatuses 2-4 with buffer positions can arbitrarily be combined with apparatuses 2-4 comprising work positions on both sides of the tunnel structure 7.

Figure 3:
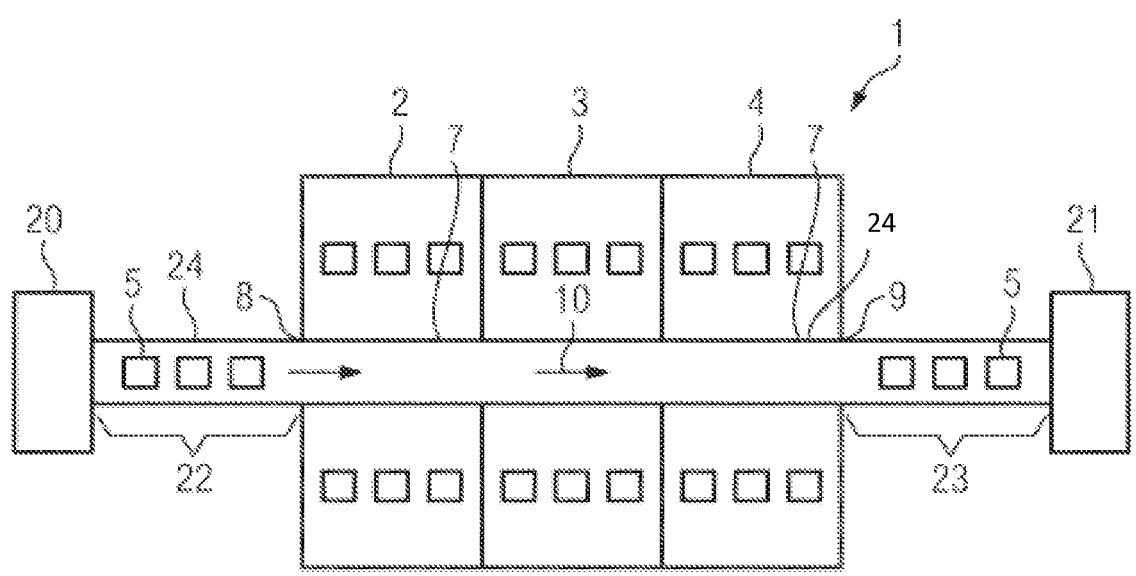
FIG. 3 shows an inventive plant according to a third embodiment.

FIG. 3 shows a plant 1 according to a third embodiment. The plant 1 depicted in FIG. 3 can be built as a plant 1, as depicted in FIG. 1 or a plant 1, as depicted in FIG. 2 or an arbitrary combination of both plants 1, for example by arbitrarily exchanging different apparatuses 2-4 from both embodiments or arbitrarily exchanging and/or adding and/or omitting and/or combining individual or multiple module positions 11-16.

Additional to the plant 1, as depicted in FIGS. 1, 2 the plant 1, as depicted in FIG. 3, comprises a pre-processing station 20 and a post-processing station 21. Modules 5 may be moved from the pre-processing station 20 via an outer buffer region 22 to the plant 1, in particular to an entrance 8 of the tunnel structure 7 of the apparatus 2, wherein the modules 5 can be arranged in a predefined order in the first outer buffer region 22, for example as they are needed in the additive manufacturing processes, performed via the apparatuses 2-4 of the plant 1.

The plant 1 further comprises a second outer buffer region 23 that connects the exit 9 of the tunnel structure 7 of the apparatus 4 of the plant 1 with the post-processing station 21. In other words modules 5 can be moved along the tunnel transport direction 10 through the tunnel structure 7 of the plant 1 and leave the apparatus 4 via the tunnel structure 7, in particular the exit 9. The modules 5 may be buffered in the second outer buffer region 23 (waiting to be post-processed via the post-processing station 21).

The plant 1, as depicted in FIG. 1, comprises a transport unit 24, for example a conveyor, to move the modules 5 along tunnel transport direction 10 from the pre-processing station 20, to the post-processing station 21. Of course, it is also possible to use mobile transport units to receive the modules 5 from the pre-processing station 20 and move the modules 5 to the tunnel structure 7 of the apparatus 2 and insert the modules 5 into the tunnel structure 7 of the apparatus 2 via the mobile transport units. It is also possible to receive the modules 5 exiting the exit 9 of the tunnel structure 7 of the apparatus 4 and move the modules 5 from the tunnel structure 7 of the apparatus 4 to the post-processing station 21. It is also possible to have a mobile transport unit integrated in each module 5 in that the modules 5 are individually movable via an integrated motor, for instance. Thus, each module 5 can particularly be moved from the pre-processing station 20 through the tunnel structure 7 into each module position 11-16 and from each module position 11-16 into the tunnel structure 7 and along tunnel transport direction 10 towards the post-processing station 21. Of course, arbitrary combinations of moving each module 5 are also feasible.

Self-evidently, the inventive method may be performed on the plant 1, preferably using at least one inventive apparatus 2-4.

The invention claimed is:

1. A plant comprising:
   at least one apparatus for additively manufacturing three-dimensional objects by means of successive layerwise selective irradiation and consolidation of layers of build material;
   at least one tunnel structure passing through the at least one apparatus;
   at least one module separably connected with the at least one apparatus, wherein the at least one module is moveable in a tunnel transport direction through the at least one tunnel structure; and,
   wherein the at least one module is further moveable inside the at least one apparatus in a first direction and a second direction to move into and out of a plurality of different module positions within the at least one apparatus, wherein the first direction and the second direction differ from the tunnel transport direction, and wherein the plurality of different module positions within the at least one apparatus comprise one or more buffer positions and one or more work positions.

2. The plant of claim 1, wherein the at least one apparatus comprises at least two work positions arranged on opposite sides of the at least one tunnel structure.

3. The plant of claim 1, wherein the at least one apparatus comprises at least one buffer position and at least one work position disposed on opposite sides of the at least one tunnel structure.

4. The plant of claim 1, wherein the first direction is substantially opposite the second direction.

5. The plant of claim 1, wherein the at least one module is moveable in a loading direction when moving from the at least one tunnel structure to one of the one or more work positions, and is moveable in an unloading direction when moving from the one of the one or more work positions back to the at least one tunnel structure.

6. The plant of claim 1, wherein the at least one module is moveable in a buffer direction when moving from the at least one tunnel structure to one of the one or more buffer positions, and is moveable in an unbuffer direction when moving from one of the one or more buffer positions back to the at least one tunnel structure.

7. The plant of claim 1, wherein at least one apparatus comprises three buffer positions.

8. The plant of claim 7, wherein the three buffer positions can hold three different types of modules.

9. The plant of claim 7, wherein the at least one apparatus comprises at least three work positions corresponding to the three buffer positions.

10. The plant of claim 1, wherein the at least one module comprises a build module, a dose module, and/or an overflow module.

11. The plant of claim 1, wherein the at least one module is moveable into and/or out of the at least one apparatus via the at least one tunnel structure.

12. The plant of claim 1, wherein the at least one apparatus for additively manufacturing three-dimensional objects by means of successive layerwise selective irradiation and consolidation of layers of build material comprises a plurality of apparatus for additively manufacturing three-dimensional objects by means of successive layerwise selective irradiation and consolidation of layers of build material, and
   wherein the plurality of apparatuses are connected via the at least one tunnel structure.

13. The plant of claim 1, wherein the at least one tunnel structure passing through the at least one apparatus comprises a first tunnel structure passing through a first apparatus and a second tunnel structure passing through a second apparatus, and wherein the first tunnel structure and the second tunnel structure are connected.

14. The plant of claim 1, wherein the at least one tunnel structure extends beyond an entrance and/or exit of the at least one apparatus.

15. The plant of claim 14, further comprising at least one outer buffer region arranged in advance and/or behind the at least one apparatus.

16. The plant of claim 15, further comprising a mobile transfer unit adapted to transfer the at least one module between a pre-processing station and the at least one tunnel structure in the outer buffer region arranged in advance of the at least one apparatus.

17. The plant of claim 15, further comprising a mobile transfer unit adapted to transfer the at least one module between a post-processing station and the at least one tunnel structure in the outer buffer region arranged behind the at least one apparatus.

18. The plant of claim 1, wherein the plant is adapted to individually load modules into the at least one tunnel structure depending on at least one vacancy parameter relating to the one or more modules, the one or more work positions, and/or the one or more buffer positions.

19. The plant of claim 1, wherein the plant is adapted to load the at least one tunnel structure with at least two modules in a predefined order.

* * * * *